United States Patent [19]

Kane

[11] 4,403,892

[45] Sep. 13, 1983

[54] APPARATUS FOR DRIVING FASTENERS AND OTHER INSERTABLE OBJECTS INTO REMOTE STRUCTURES

[76] Inventor: Patrick J. Kane, 6725 Caris Rd., Vestaburg, Mich. 48891

[21] Appl. No.: 202,937

[22] Filed: Nov. 3, 1980

[51] Int. Cl.[3] ........................ B23B 39/14; B23B 47/30; E21C 9/00; E21C 11/00

[52] U.S. Cl. ........................................ 408/95; 173/32

[58] Field of Search ........................ 408/76, 87, 89, 90, 408/91, 95, 103, 105, 108; 294/20; 248/571; 227/156; 173/32, 33

[56] References Cited

U.S. PATENT DOCUMENTS

| | | | |
|---|---|---|---|
| 55,695 | 6/1866 | Nevergold et al. . | |
| 258,716 | 5/1882 | Cox . | |
| 408,158 | 7/1889 | Beall . | |
| 673,191 | 4/1901 | Arthur | 294/20 |
| 793,146 | 6/1905 | Nolan . | |
| 863,941 | 7/1907 | Robbins . | |
| 1,040,395 | 10/1912 | Oslund | 408/91 |
| 1,126,313 | 1/1915 | Sturdevant et al. | 408/91 |
| 1,154,035 | 9/1915 | Locke . | |
| 1,247,362 | 11/1917 | Bell | 294/20 |
| 1,790,896 | 10/1931 | Bondy . | |
| 2,203,415 | 6/1940 | Lavarack et al. | 408/91 |
| 2,373,785 | 4/1945 | Seaboly | 408/99 |
| 2,394,988 | 2/1946 | De Moss . | |
| 2,440,852 | 5/1948 | Elford | 408/99 |
| 2,466,965 | 4/1949 | Pitts | 408/99 |
| 2,844,977 | 7/1958 | Morse | 408/76 |
| 2,881,643 | 4/1959 | Haade | 408/76 |
| 3,016,073 | 1/1962 | Broussard et al. . | |
| 3,049,031 | 8/1962 | Carstens | 227/156 |
| 3,272,267 | 9/1966 | Langas | 227/156 |
| 3,310,215 | 3/1967 | Bostick | 227/156 |
| 3,505,714 | 4/1970 | Boileau . | |
| 3,624,876 | 11/1971 | Irvin . | |
| 3,877,280 | 4/1975 | Cornell | 30/366 |
| 3,977,088 | 8/1976 | Bondi | 227/156 |
| 4,184,795 | 1/1980 | Medlin . | |
| 4,254,549 | 3/1981 | McMullin | 30/251 |
| 4,284,223 | 8/1981 | Salcido et al. | 227/156 |

*Primary Examiner*—Robert E. Garrett
*Assistant Examiner*—Paul M. Heyrana, Sr.
*Attorney, Agent, or Firm*—Price, Heneveld, Huizenga & Cooper

[57] ABSTRACT

An apparatus for driving fasteners, drills, bits, and similar insertable objects into ceilings, trusses, and other remote structures, comprises a drive head mounted on one end of an elongate support. The drive head has a retainer for holding a fastener or bit, and is powered by a rotary drill, impact motor, or the like, which drives the fastener/bit into the object structure. A clamping arm is mounted at the upper end of the support, and is positioned to converge and diverge with the drive head. The drive head motor and clamp arm are controlled from the lower end of the support, whereby during operation, the clamping arm abuts the object structure at a side thereof opposite from the drive head and is converged with the drive head to apply tip pressure to the fastener/bit and resist reaction forces developed therebetween.

32 Claims, 6 Drawing Figures

APPARATUS FOR DRIVING FASTENERS AND OTHER INSERTABLE OBJECTS INTO REMOTE STRUCTURES

BACKGROUND OF THE INVENTION

The present invention relates to power tools, and in particular to a building construction tool for installing fasteners, drilling holes, and performing other similar operations in remote structures, such as overhead beams and trusses.

One popular type of building construction for commercial structures is known in the trade as a "hung" ceiling, wherein relatively high, overhead steel beams or trusses support ribbed or corrugated ceiling panels. An asphalt roof, or other similar structure, covers the exterior side of the ceiling panels to form a watertight roof surface.

In this type of building construction, as well as others incorporating the same general concept, the finished ceiling, as well as many other mechanics for the building, such as plumbing, fire sprinkler lines, heating and cooling ducts, lighting, etc., are suspended overhead from the trusses and/or ceiling panels. The utilities are typically attached to the building roof by wire or chain hangers.

Heretofore, wire hangers have been installed in such construction arrangements by punching a hole through the sides of the ceiling panel rib, inserting the free end of the hanger through the punched holes, and wrapping it around the depending portion of the hanger. The lower end of the hanger is then connected with the object to be supported. In such installations, the installer is required to stand on a ladder or scaffolding to perform this task, and must continually move the support along with his work. The wire wrapping technique described above is quite tedious and time consuming, and generally must be performed at a rather unsafe height. If existing heating ducts, pipes, or the like, are in the way of the desired positioning of the hanger, it is very difficult to anchor the upper end of the hanger in the ceiling. For instance, when large heating and cooling ducts are disposed directly above the desired location of the hanger, the installer must crawl on top of the ducts and attach the hanger to the ceiling, and then thread it down between the ducts. In like manner, the installation of fasteners, and/or formation of apertures in other types of remotely positioned structures, such as underwater objects, laterally inaccessible structures, and the like, present problems similar to those set forth above, and are contemplated by the present invention.

SUMMARY OF THE INVENTION

One aspect of the present invention is to provide an apparatus for driving fasteners, drills, bits and other insertable tools and objects into overhead and other remote structures. The apparatus comprises a drive head having means for detachably retaining one such insertable object therein at a predetermined orientation. Means such as a rotary drill or impact head are provided to power the retaining means and drive the object into the surface of the supporting structure. The drive head is mounted on one end of an elongate support, which has a length sufficient to permit the user to reach the remote structure with the drive head, with the other end of the support adapted for grasping. A clamping arm is mounted adjacent the drive head, and is movable with respect thereto in the nature of a jaw for converging and diverging one end of the arm with respect to the drive head. The clamping arm and drive head power mechanism are controlled from the grasping end of the support, whereby during operation, the clamping arm is positioned abutting a portion of the object structure opposite from the drive head, and is converged with the drive head to apply tip pressure to the insertable object, and resist reaction forces developed therebetween as the same is driven into the structure. Preferably, the clamping arm is manipulated by a laterally extending brace arm, which also serves to stabilize the apparatus, and axially orient the drive head. In overhead ceiling installations, the drive head preferably has a right angled output shaft with a socket in which self-tapping fasteners are positioned for fastening a plate portion of a hanger to the side of a ceiling panel rib.

The principal objects of the present invention are to provide a roof for installing fasteners or forming apertures in remote objects, which permits the installer to securely position himself in a safe, stationary location. One embodiment of the present invention is particularly adapted for installing overhead ceiling hangers in roof panel ribs without using a ladder, scaffolding, or other elevating device, and is sufficiently maneuverable to permit the installer to attach the hangers in confined or obstructed areas. The installation device is easy and uncomplicated to operate, and includes a clamping arm which quickly and accurately drives a self-tapping fastener into the ceiling panel. The device is relatively lightweight, and the clamping arm is manipulated by a laterally extending handle or arm which also acts as a stabilizer. The drive head is adjustable to accommodate installing fasteners into differently sized and shaped ceiling constructions. The device is extremely efficient in use, greatly reduces the safety hazards associated with installing ceiling hangers, and is particularly well adapted for the proposed use.

These and other features, advantages, and objects of the present invention will be further understood and appreciated by those skilled in the art by reference to the following written specification, claims and appended drawings.

DETAILED DESCRIPTION OF THE PREFERRED EMBODIMENTS

Figure 1:
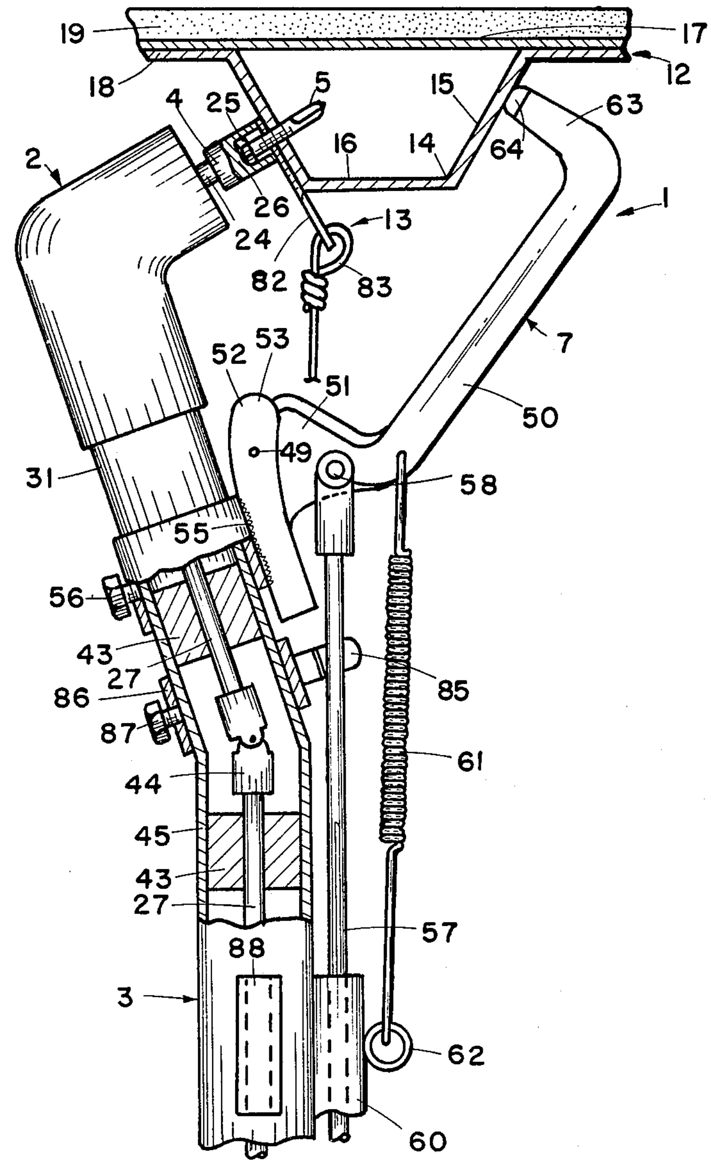
FIG. 1 is a fragmentary, side elevational view of an apparatus embodying the present invention, with portions thereof broken away to reveal internal construction, and shown installing a hanger in a ceiling rib.
Figure 1:
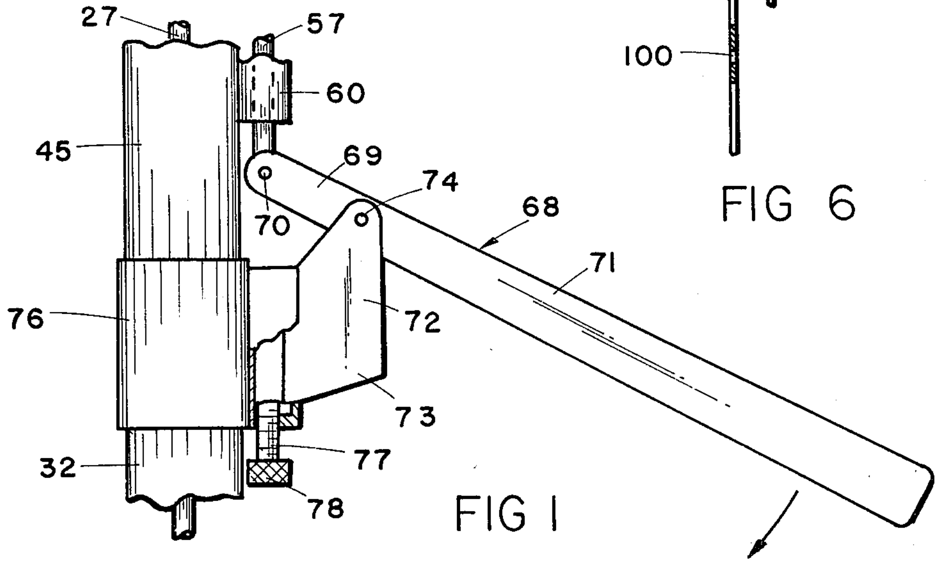

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

The reference numeral 1 (FIG. 1) generally designates an apparatus for driving insertable objects into ceilings, trusses, joists, and other remote structures. The term "insertable objects" as used herein contemplates nails, wood screws, self-tapping metal screws, drills, bits, and other similar devices. Hence, the present invention specifically contemplates both installing fasteners and forming apertures, as well as other related functions which are apparent to the artisan. Apparatus 1 comprises a drive head 2 mounted on one end of an elongate support 3. Drive head 2 includes a retaining mechanism for holding a fastener or bit, such as self-tapping screw 5. A motor, such as an impact motor or rotary drill 6 (FIG. 3) drives the fastener or bit into the object structure. A clamping arm 7 (FIG. 1) is mounted at the upper end of support 3, and is positioned to converge and diverge with drive head 2, in the nature of a jaw. Drive motor 6 and clamping arm 7 are controlled from the lower end of support 3, whereby during use, clamping arm 7 abuts the object structure at the side opposite from drive head 2, and is converged with the drive head to apply tip pressure to the fastener or bit retained in mechanism 4 and resist reaction forces developed therebetween.

Apparatus 1 is generally adapted for either installing fasteners or forming apertures in remotely disposed structures, including objects positioned out of the normal reach of an installer. Such objects can include structures disposed under a fluid, such as water or the like, or objects positioned in inaccessible or unreachable locations, either to the left or to the right of the user, as well as below or above him. It is to be understood that the present invention contemplates all such uses and applications, as is apparent to one having ordinary skill in the art.

Figure 2:
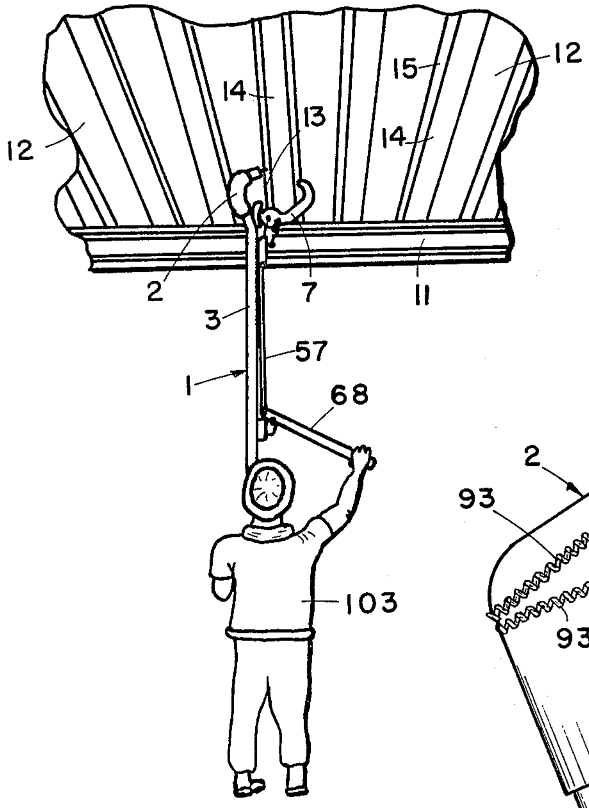
FIG. 2 is a partially schematic, perspective view of a user operating the present invention by installing a hanger in a ceiling rib.

In the illustrated example, apparatus 1 is shown installing a self-tapping screw 5 into an overhead ceiling panel 12 of a building or the like, to anchor a hanger 13 therein. As shown in FIG. 2, the ceiling panels 12 are supported by elongate steel trusses or beams 11. Each ceiling panel 12 is constructed of relatively thick sheet steel, and includes depending ribs or corrugations 14 with inclined sides 15, and a horizontal base 16. A cover sheet 17 extends over the upper surface 18 of ceiling panels 12, and a tar or asphalt layer 19 is formed thereover to provide a waterproof roof. Ceiling ribs 14 depend in regular intervals from ceiling panels 12, and have a generally trapezoidal or wedge shape, wherein sides 15 are inclined inwardly at an angle in the nature of 120° from upper surface 18.

Drive head 2 is of a conventional construction, and is connected with retainer mechanism 4 by an output shaft 24. It is to be understood that retainer mechanism 4 contemplates any device which is capable of holding a fastener, bit, or other similar insertable tool or object in a predetermined orientation with respect to drive head 2. In the case of a bit (not shown), retainer 4 comprises any suitable chuck or brace arrangement. In the illustrated structure, retaining mechanism 4 is a socket shaped to receive the hexagonal head 25 of self-tapping screw 5 therein, and includes a magnetic base 26 which detachably retains screw 5 in socket 4 until the fastener has been tightened into place.

In this example, drive head 2 is a right angle rotary drill, with drive shaft 27 disposed substantially perpendicular with output shaft 24. Drive head 2 includes a conventional power transmission assembly (not shown) such as beveled gears, a universal joint, or the like, to redirect the direction of rotational power.

The upper end 31 of support 3 on which drive head 2 is mounted is inclined slightly with respect to the body of support 3. Upper support end 31 is preferably inclined at an angle which orients output shaft 24 and socket 4 in a perpendicular relationship with the surface of the object into which the fastener is to be secured, or hole drilled, such as ceiling rib sidewall 15. In this example, upper support end 31 is angled between 10° and 30° with respect to the central axis of support body 3.

Figure 3:
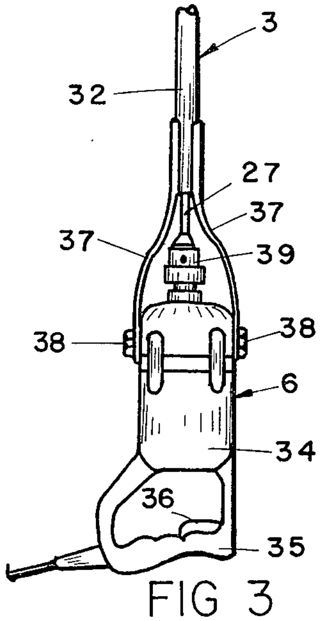
FIG. 3 is a side elevational view of a lower portion of the apparatus.

Drive motor 6 (FIG. 6) contemplates any structure capable of advancing retainer 4, and thereby driving either a fastener, bit, or the like, into the object structure, and may include an impact motor, hydraulic motor, vibratory motor, or other comparable devices. It is to be understood that drive motor 6 can be located at any suitable position on the apparatus 1, including at the drive head 2, or the lower end 32 of support 3, as shown in FIG. 3. In this example, drive motor 6 comprises a conventional electric drill having a pistol grip 35 with switch 36 at the base thereof, and a U-shaped bracket 37 attached to the drill housing by fasteners 38 which extend through threaded sockets in which support handles for the drill are normally retained. Drill 34 has a conventional chuck 39 in which the lower, terminal end of drive shaft 27 is mounted. For rotary drive embodiments, drive shaft 27 can be provided with a clutch (not shown) to insure consistent tightening of the fasteners to a predetermined torque.

Support 3 (FIG. 1) is a rigid, elongate structure having sufficient length to permit a user to reach a remote object with drive head 2 from a ground level position, such as a floor or other stable, relatively stationary support. The illustrated support 3 is tubular, with a substantially circular transverse cross-sectional shape, and drive shaft 27 extends through the interior of support 3, concentric therewith. Bearings 43 position drive shaft 27 in the center of the support interior, and a universal joint 44 interconnects upper and lower drive shaft segments at that portion of support 3 where upper end 31 is inclined with respect to the support lower end 32. Support 3 is preferably lightweight for ease of use, and can be constructed from aluminum or the like. The positioning of drive motor 6 at the base of support 3 provides stability, and reduces the effort required for manual manipulation of the apparatus.

Clamping arm 7 (FIG. 1) is movably connected with support 3 adjacent drive head 2 to form a jaw which is capable of grasping the opposite side of the object structure, applying tip pressure to self-tapping screw 5, and resisting those reaction forces developed therebetween, so as to quickly install the fastener in place. The illustrated clamping arm 7 includes a C-shaped jaw 50 which is pivotally mounted at its base 51 to an adjustable bracket 52 positioned on upper support end 31. Bracket 52 includes a pair of clevis-like ears 53, between which jaw base 51 is rotatably mounted by pin 49. Bracket ears 53 are fixedly attached to a sleeve 54 by means such as weld 55. Sleeve 54 is longitudinally slideable on support upper end 31, and detachably interconnected therewith by a set screw 56. Jaw 50 is manipulated from the lower end of support 3, and can be activated by any suitable means, such as a pneumatic motor and valve, a solenoid and switch, or the like. In this example, drive rod 57 is pivotally connected with jaw 50 by a clevis bracket 58 at a location on the base of the jaw spaced laterally from pin 49. Sleeve shaped guides 60 are attached to the exterior of support 3 along the right-hand side of the same (as viewed in FIG. 1) in a regularly spaced apart fashion, and slidingly receive drive rod 57 therein, so that the drive rod can be smoothly reciprocated from the lower end of the apparatus. A coil spring 61 has one end connected with jaw 50 at a position spaced to the right or outboard of clevis 58, and the other end attached to an eyelet 62 on the uppermost guide 60. Spring 61 is pretensed, so that it pulls jaw 50 downwardly and normally retains the same in a fully open position, diverged from drive head 2. The upper end 63 of jaw 50 is bent inwardly toward drive head 2, and includes laterally extending arms 64 at the terminal or free end thereof. Arms 64 are shaped to abut the ceiling rib sidewall 15, and facilitate axial alignment of drive head 2.

An arm 68 (FIG. 1) is pivotally attached to the lower end 32 of support 3, and includes an interior end 69 pivotally attached to the lower end of drive rod 57, and an outer end 70, which extends generally laterally from support 3 and includes a free end which is adapted for grasping by the user. Arm 68 is pivotally attached to support 3 by an adjustable bracket 72, comprising a slide 73 to which arm 68 is pivotally mounted by a pin 74, and a housing 75 in which side 73 is slidingly received. Housing 75 is fixedly attached to a cylindrical sleeve 76, which in turn is fixedly mounted on the support lower end 32. A threaded adjustment bolt 77 has its upper end rotatably mounted in the base of slide 73, a medial portion threadedly engaged with the end of housing 75, and a knurled outer end 78 adapted for grasping. Rotation of knurled end 78 causes slide 73 to move with respect to housing 75, and thereby vary the distance between pins 70 and 74 to adjust the jaw opening for variously sized object structures. Downward rotation or arm 68, as shown by the arrow in FIG. 1, overcomes the tension force of coil spring 61, and slides push rod 57 upwardly, so as to close jaw 60, pivotally converging end 63 with drive head 2. The difference in length between the inner and outer arm segments 69 and 71 respectively in comparison with the distance between pivot points 49 and 58 provides a mechanical advantage in pivoting jaw 50 which permits the installer to apply substantial tip pressure to the bit or fastener, and accurately control the same. Upon the release of force on the outer end of arm 68, coil spring 61 returns jaw 60 to the normally fully open position, in which the jaw and drive head 2 are fully diverged.

Figure 5:
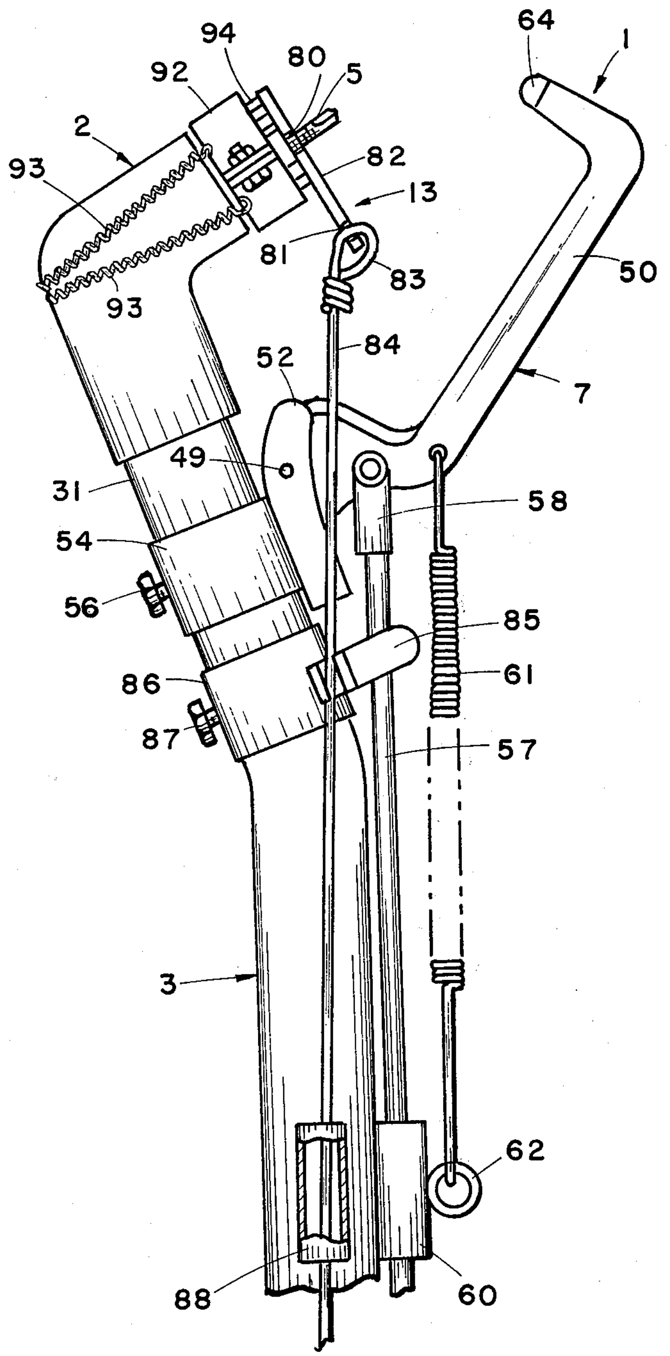
FIG. 5 is a fragmentary, side elevational view of the apparatus, with a hanger shown connected therewith, and a magnetic head attached to the same for retaining the hanger in place.

As best illustrated in FIG. 5, apparatus 1 is particularly adapted for attaching a specially designed hanger 13 to ceiling panel 12. Hanger 13 includes a flat plate 82, which is preferably constructed from a relatively rigid, yet bendable material such as sheet metal, or the like. Plate 82 includes a first aperture 80 through a medial portion thereof in which fastener 5 is received, and a second aperture 81 in which the looped end 83 of a depending hanger 84 is mounted. Hanger 84 may be constructed of metal strapping for duct supports, chain for plumbing supports, or other suitable materials, depending upon the device to be mounted. In the illustrated example, depending hanger 84 is a wire hanger, with the upper end threaded through the second slip aperture 81 and twisted about the depending wire shaft or shank.

Another preferred hanger form (not shown) comprises a wire shank similar to shaft 84, but without plate 82. A loop is twisted in the upper end of the shank, shaped for reception over fastener 5. In this arrangement, a washer (not shown) is positioned adjacent the head of screw 5 to insure a secure abutment between the fastener and looped hanger end.

A spring clip 85 (FIG. 5) is mounted on a sleeve 86 at the upper end 31 of support 3, and includes a set screw 87 for detachably interconnecting the sleeve and support at a desired location. The depending wire portion 84 of hanger 13 is positioned between the jaws of clip 85 to retain the hanger in place on the apparatus until it is securely installed in the ceiling, or other remote structure. Also, a safety sleeve 88 is positioned on the side of support 3, at a location slightly below upper end 31, and is adapted to receive the shaft portion 84 of hanger 13 therein. In the event hanger 13 should become inadvertently detached from drive head 2 during use and slip out of the clip 85, the plate portion 82 of the hanger is sufficiently large to engage the upper edge of safety sleeve 88 and prevent the hanger from bodily falling onto the installer therebelow.

Figure 4:
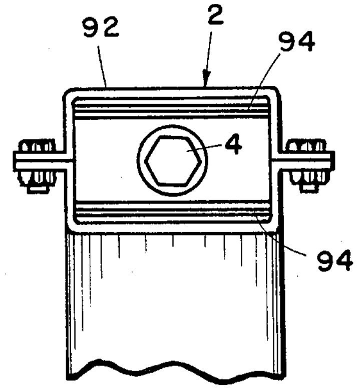
FIG. 4 is a fragmentary, front elevational view of a drive head portion of the apparatus.

A magnetic catch 92 (FIGS. 4 and 5) is attached to the forward surface of drive head 2 by a pair of coil springs 93, and function to securely retain hanger plate 82 in position in drive head 2. In this example, catch 92 includes two sets of permanent magnets 94 disposed on upper and lower sides of socket 4.

Figure 6:
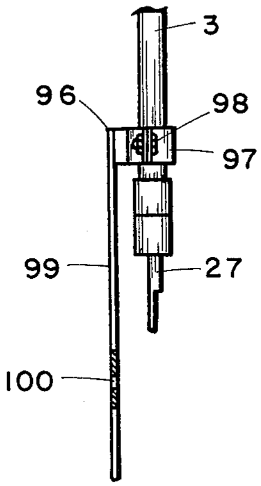
FIG. 6 is a side elevational view of another embodiment of the present invention, wherein a single arm adapter is provided to attach a rotary motor to the lower end of the apparatus.

An alternative motor bracket arrangement 96 is illustrated in FIG. 6, and includes a split sleeve clamp 97 with fasteners 98 to constrictingly attach bracket 96 to the lower end 32 of tubular support 3. A longitudinally extending arm 99 is rigidly affixed to clamp 97, and includes a laterally extending aperture 100 adjacent the free end thereof, through which the conventional handle of an electric drill may be inserted to connect the drill with the apparatus. The location of aperture 100 is such that nearly all conventional electric drills can be attached to the apparatus, with the chuck portion 39 of the drill being positioned to receive the lower end of drive shaft 27 therein.

In installing a hanger in a ceiling panel 12, the operator first selects a hanger which has sufficient length to suspend the pipe, heating duct, or other utility thereon. As best illustrated in FIG. 5, when installing hung ceiling utilities from ceiling panel ribs, hangers 13 are preferably of the type which include a mounting plate 82. With this type of hanger 13, plate 82 is attached to the side of the truss or ceiling panel beam, so that shear, non-axial forces are applied to the fastener by the weight of the suspended object. When the support side is not perfectly vertical, like the inclined walls 15 of rib 14, the lower end of hanger plate 82 bends to the proper angle, while the upper portion of the hanger plate remains parallel and abutting the support wall.

The end of wire 84 is inserted through safety sleeve 88, and the jaws of clip 85 are clamped about the upper end of the hanger. Clip sleeve 86 can be adjusted if necessary by loosening set screw 87. A self-tapping screw 5 is inserted into socket 4, and the magnet in the base 26 of the socket retains the fastener in an axially aligned, predetermined orientation in the socket.

Hanger plate 82 is then positioned onto retainer magnets 92, and the free, drill shaped end of the fastener is received through the medial plate aperture 80. In this embodiment, the installer then positions himself below the ceiling panel rib in which the hanger is to be anchored, as shown in FIG. 2. The apparatus 1 is then lifted upwardly into position, with the rib 14 disposed between the tip of screw 5 and the free end 64 of jaw 50. Since drive head 2 is relatively small, it can be inserted between existing overhead utilities. Installer 103 then grasps the free end of arm 68, and rotates the same downwardly, until jaw free end 64 comes into abutment with the right-hand side 15 of ceiling rib 14. Adjustment screw 77 is manipulated if the jaw fails to open or close properly about panel ribs 14. The installer then activates drive motor 6, which in this example is accomplished by depressing trigger 36 on electric drill 34 by the left hand of the installer. This action rotates drive shaft 27, which in turn rotates the output shaft 24 of drive head 2, socket 4, and screw 5. In this position, arm 68 functions to stabilize the apparatus in the desired position, and axially orients the head and fastener with respect to the surface in which fastener 5 is being driven. The laterally extending jaw ears 64 also serve to orient drive head 2 perpendicular with surface 15 when jaw 50 is closed about the ceiling rib. Operator 103 continues to urge lever 68 downwardly, thereby applying tip pressure to self-tapping fastener 5, and resisting the reaction forces which are developed therebetween. This clamping action causes the cutting tip of fastener 5 to form an aperture in rib sidewall 15, and tap and thread the fastener into a tight, abutting position against hanger plate 82 and ceiling rib 14. After hanger 13 is fixed securely in place, installer 103 releases his grip on brace arm 68, and spring 61 automatically returns jaw 50 to the fully open position. Installer 103 then pulls the apparatus to the left and downwardly from rib 14, to disengage the head 25 of fastener 5 from socket 4, and release the grip of safety clip 85 on wire 84. Downward translation of the apparatus with respect to hanger 13 causes safety sleeve 88 to slide over hanger shaft 84, until the same are bodily separated. Operator 103 then loads the apparatus with a new fastener and hanger, and repeats the above described operation at the next selected location. The building ceiling, plumbing, or other utility is then attached to and suspended from the lower ends of the hangers.

When a bit or drill (not shown) is installed in retainer 4, apparatus 1 is adapted to form apertures in a manner quite similar to the above described procedure for installing fasteners 5. The tip of the bit is driven into the object structure by a rotary drill action, impact motion, or the like, and clamping arm 7 applies tip pressure to the bit, and resists reaction forces developed therebetween, as the bit is driven into the object structure. After an aperture is so formed, a fastener can be inserted thereinto with the present invention by centering the fastener over the aperture and practicing the above described steps.

The present apparatus is particularly adapted for installing hangers in hung ceiling constructions, without using a ladder, scaffolding, or other elevating mechanism. Hence, the installation of the hangers is extremely quick, efficient, safe, easy, and uncomplicated. Brace arm 68 not only provides a convenient mechanism for controlling tip pressure, but also provides a stabilizer, which enables the user to accurately position the fastener. The inclined right angle drive head, in conjunction with the prefabricated hangers having sheet metal plates, particularly adapt the device for anchoring finish ceilings, plumbings, lighting, and other building utilities from the corrugated ribs of the ceiling panels of a building. The adjustability of the clamping arm adapts the apparatus for use in conjunction with ceilings having differently sized and shaped corrugations.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. An apparatus for driving fasteners, drills, bits and other similar insertable objects into remote, overhead strutures, comprising:

a drive head having means for detachably retaining one such insertable object therein at a predetermined orientation;

means for powering said retaining means to drive the object into a surface of a remotely disposed, overhead structure;

an elongate support having said drive head mounted on one end thereof, with the other support end adapted for grasping; said support having a length sufficient to permit a user to reach a remotely disposed, overhead structure with said drive head;

means for controlling said power means from said support other end;

a clamping arm mounted adjacent said drive head, and being movable with respect thereto for converging and diverging one end of said arm with said drive head; and a clamping arm controller mounted on the other end of said support, operable connected with said clamping arm, and including means for opening and closing said clamping arm independently of movement of said support, whereby during object insertion, said support is held so that said clamping arm is positioned abutting a portion of the remote structure disposed generally opposite from the object surface, and said controller is manipulated to converge said clamping arm one end with said drive head to apply tip pressure to the object, and resist reaction forces developed therebetween.

2. An apparatus as set forth in claim 1, wherein said clamping arm opening and closing means comprises:

a brace arm pivotally connected with said support adjacent the other end thereof, extending generally laterally thereof, and having a free end adapted for grasping to axially orient and stabilize said drive head, and being pivoted to manipulate said clamping arm.

3. An apparatus as set forth in claim 2, wherein:

said power means comprises a rotary motor mounted on said support other end, and a drive shaft connected therewith for transmitting rotational motion to said drive head.

4. An arrangement for installing hanging utilities and the like, comprising:

a self-tapping fastener having a head and a shank;

a hanger having an aperture through which said fastener is received;

a drive head having means for detachably retaining the head of said fastener therein at a predetermined orientation;

means for powering said retaining means to drive the fastener into a surface of an overhead ceiling structure;

an elongate support having said drive head mounted on one end thereof, with the other support end adapted for grasping; said support having a length sufficient to permit to reach the overhead ceiling structure with said drive head from a ground level position;

means for controlling said power means from said support other end;

a clamping arm mounted adjacent said drive head, and being movable with respect thereto for converging and diverging one end of said arm with said drive head;

means for controlling said clamping arm from said support other end; and a clip connected with said support adjacent the one end thereof, and having jaws adapted to detachably grip said hanger and hold the same in place during installation, whereby during fastener insertion, said clamping arm is positioned abutting a portion of the ceiling structure disposed generally opposite from the fastener surface and is converged with said drive head to apply tip pressure to the self-tapping fastener, and resist reaction forces developed therebetween as the fastener is driven into the ceiling structure to securely attach said hanger to the same.

5. An arrangement for installing hanging utilities and the like, comprising:

a self-tapping fastener having a head and a shank;

a hanger having an aperture through which said fastener is received;

a drive head having means for detachably retaining the head of said fastener therein in a predetermined orientation;

means for powering said retaining means to drive the fastener into a surface of an overhead ceiling structure;

an elongate support having said drive head mounted on one end thereof, with the other support end adapted for grasping; said support having a length sufficient to permit to reach the overhead ceiling structure with said drive head from a ground level position;

means for controlling said power means from said support other end;

a clamping arm mounted adjacent said drive head, and being movable with respect thereto for converging and diverging one end of said arm with said drive head;

means for controlling said clamping arm from said support other end; and a safety sleeve connected with said support adjacent the one end thereof, and adapted to receive a shank portion of said hanger therethrough, and shaped to prevent an enlarged upper end of said hanger from passing therethrough to prevent the hanger from inadvertently falling, whereby during fastener insertion, said clamping arm is positioned abutting a portion of the ceiling structure disposed generally opposite from the fastener surface and is converged with said drive head to apply tip pressure to the self-tapping fastener, and resist reaction forces developed therebetween as the fastener is driven into the ceiling structure to securely attach said hanger to the same.

6. An arrangement as set forth in claim 4 or 5, wherein:

said fastener is inserted generally laterally into a rib sidewall of said ceiling structure.

7. An arrangement as set forth in claim 4 or 5, wherein:

said hanger includes a sheet metal plate connected with the upper end thereof, and having said fastener aperture therethrough.

8. An arrangement as set forth in claim 5, including:

a clip connected with said support adjacent the one end thereof, and having jaws adapted to detachably grip said hanger and hold the same in place during installation.

9. An arrangement as set forth in claim 8, wherein:

said hanger includes a sheet metal plate connected with the upper end thereof and having said fastener aperture therethrough; and said fastener is inserted generally laterally into a rib sidewall of said ceiling structure.

10. An arrangement as set forth in claim 9, including:

a magnet attached to said drive head and positioned for abutment with said plate to retain said hanger in plate during installation.

11. An arrangement as set forth in claim 4 or 5, including:

a magnet attached to said drive head and positioned for abutment with said plate to retain said hanger in place during installation.

12. An apparatus for forming apertures in remotely disposed, overhead structures, and the like, comprising:

a drive head having means for detachably retaining a bit therein at a predetermined orientation;

means for powering said retaining means to drive the bit into a surface of a remotely disposed, overhead structure;

an elongate support having said drive head mounted on one end thereof, with the other support end adapted for grasping; said support having a length sufficient to permit a user to reach a remotely disposed, overhead structure with said drive head;

means for controlling said power means from said support other end;

a clamping arm mounted adjacent said drive head, and being movable with respect thereto for converging and diverging one end of said arm with said drive head; and a clamping arm controller mounted on the other end of said support, operably connected with said clamping arm, and including means for opening and closing said clamping arm independently of movement of said support, whereby during aperture formation, said support is held so that said clamping arm is positioned abutting a portion of the remote structure disposed generally opposite from the bit surface, and said controller is manipulated to converge said clamping arm one end with said drive head to apply tip pressure to the bit, and resist reaction forces developed therebetween as the bit is driven into the structure.

13. An apparatus as set forth in claim 11, wherein:

said power means comprises a rotary motor mounted on said support other end, and a drive shaft connected therewith and transmitting rotational motion to said drive head retaining means.

14. An apparatus as set forth in claim 11, wherein: said clamping arm control means comprises a brace arm pivotally mounted on said support adjacent the other end, and extending laterally therefrom for manipulating said clamping arm and axially orienting said drive head.

15. An apparatus as set forth in claim 14, wherein: said power means comprises a rotary motor mounted on said support other end, and a drive shaft connected therewith and transmitting rotational motion to said drive head retaining means.

16. An apparatus as set forth in claim 3, wherein: said clamping arm is C-shaped, with a base pivotally connected with said support, and said one end being free and having laterally projecting ears shaped for abutment with the structure into which the fastener is to be driven.

17. An apparatus as set forth in claim 16, including: a spring having one end connected with said clamping arm, the other end connected with said support, and being pretensed to normally retain said clamping arm in an open position, wherein said clamping arm one end is spaced apart from said drive head.

18. An apparatus as set forth in claim 17, wherein: said clamping arm is longitudinally slideable on said support for adjusting clamping arm position, and includes means for detachably interconnecting the same in a selected positional relationship with said drive head.

19. An apparatus as set forth in claim 18, wherein said clamping arm control means includes:
a push rod having one end pivotally connected with said clamping arm, and the other end pivotally connected with an interior end of said brace arm, whereby pivoting said brace arm opens and closes said clamping arm.

20. An apparatus as set forth in claim 19, including: means for adjusting the location of the point at which said brace arm is pivotally connected with said support, with respect to the location of the point at which said brace arm is pivotally connected with said push rod for varying the opening and closing action of said clamping arm.

21. An apparatus as set forth in claim 20, including: guides mounted along the length of said support in which said push rod is slideably mounted.

22. An apparatus as set forth in claim 21, wherein: said clamping arm free end includes laterally extending ears to retain the fastener in a perpendicular relationship with the fastener side of the remote structure during fastener driving.

23. An apparatus as set forth in claim 22, wherein: said rotary motor comprises a conventional, electric power drill, with the corresponding drive shaft end chucked therein.

24. An apparatus as set forth in claim 23, wherein: said drive head retaining means comprises a socket shaped to retain a self-tapping fastener therein.

25. An apparatus as set forth in claim 24, wherein: said support is tubular; and
said drive shaft extends through the interior of said support.

26. An apparatus as set forth in claim 25, wherein: said drive head is angled with respect to said support for driving fasteners into the sides of the structure.

27. An apparatus as set forth in claim 26, wherein: said drive head has a right angled output shaft on which said fastener retaining means is mounted;
said support one end is inclined to said support at an obtuse angle for driving fasteners into generally wedge-shaped overhead ribs; and
said drive shaft includes a universal joint at the point of inclination of said support one end.

28. An apparatus as set forth in claim 1, wherein: said drive head retaining means comprises a socket shaped to retain a self-tapping fastener therein.

29. An apparatus as set forth in claim 1, wherein: said power means comprises a rotary motor mounted on said support other end, and a drive shaft connected therewith for transmitting rotational motion to said drive head.

30. An apparatus as set forth in claim 29, wherein: said rotary motor comprises a conventional, electric power drill, with the corresponding drive shaft end chucked therein.

31. An apparatus as set forth in claim 1, wherein: said drive head is angled with respect to said support for driving fasteners into the sides of the structure.

32. An apparatus as set forth in claim 1, wherein: said clamping arm is C-shaped, with a base pivotally connected with said support, and said one end being free and having laterally projecting ears shaped for abutment with the structure into which the fastener is to be driven.

* * * * *